United States Patent [19]

Sekulovski

[11] Patent Number: 5,066,062

[45] Date of Patent: Nov. 19, 1991

[54] FUEL TANK LOCK

[76] Inventor: Bill G. Sekulovski, 1363 Harvest Bend, Windsor, Ontario, Canada, N9H 2B5

[21] Appl. No.: 581,895

[22] Filed: Sep. 13, 1990

[51] Int. Cl.⁵ .................................................. B62D 39/00
[52] U.S. Cl. .................................. 296/97.22; 292/144; 292/DIG. 25
[58] Field of Search ...................... 296/97.22; 292/201, 292/144, DIG. 25; 220/86.2

[56] References Cited

U.S. PATENT DOCUMENTS

| | | | |
|---|---|---|---|
| 4,176,867 | 12/1979 | Lipschutz | 292/144 |
| 4,277,094 | 7/1981 | Rone | 296/97.22 |
| 4,458,930 | 7/1984 | Goike et al. | 296/97.22 |
| 4,468,058 | 8/1984 | Haagen et al. | 292/144 |

Primary Examiner—Robert R. Song

[57] ABSTRACT

An electrically-operated mechanism for locking a lid or filler cap associated with a fuel filler tube in an automotive vehicle. Switch mechanisms located in the driver compartment are used to remotely control a solenoid or reversible electric motor in the compartment containing the filler tube. The vehicle battery is used as the power source for the motor or solenoid.

7 Claims, 3 Drawing Sheets

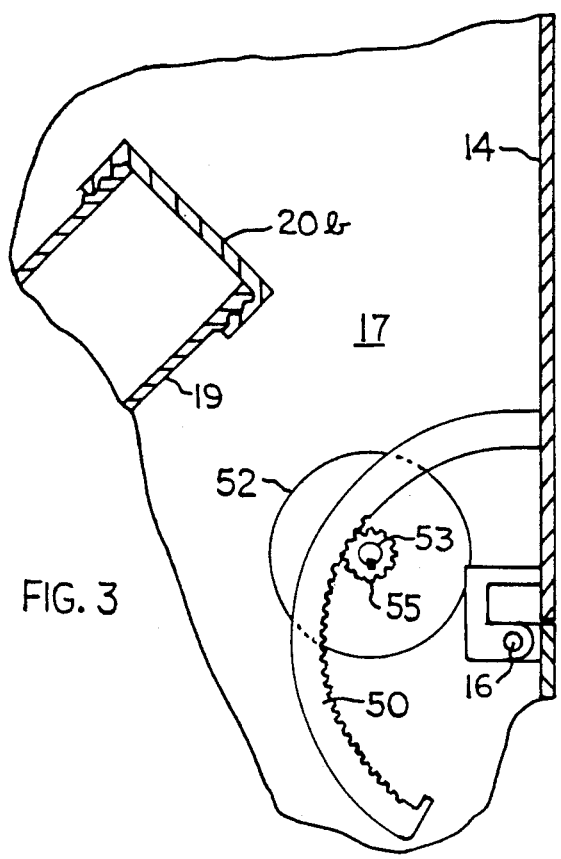
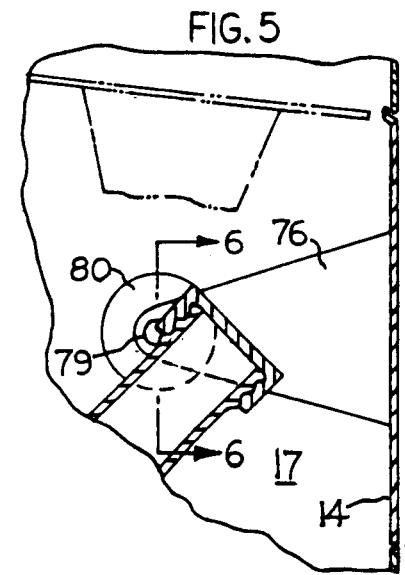
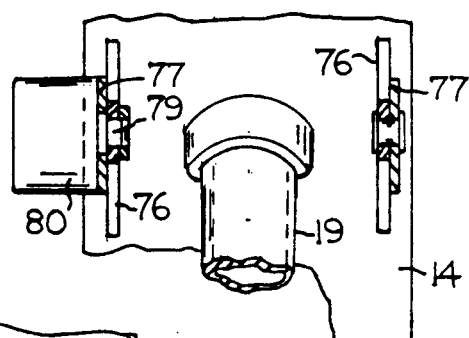
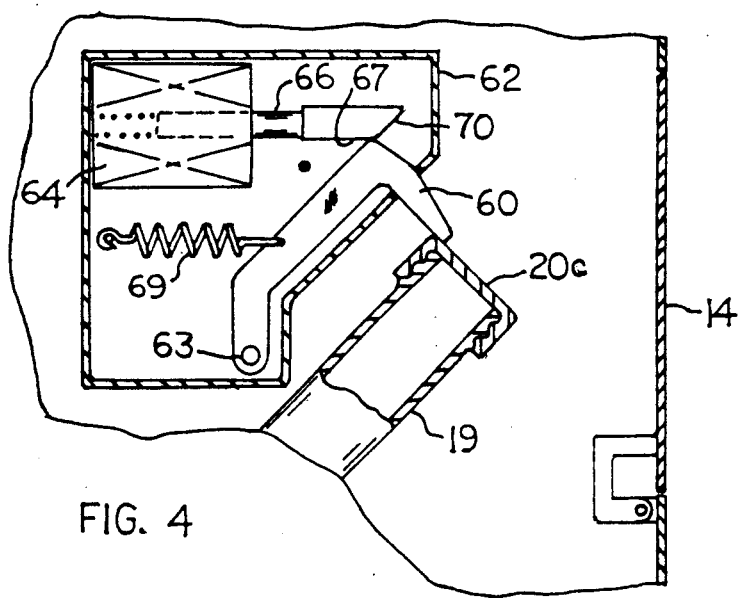

5,066,062

FUEL TANK LOCK

BACKGROUND AND SUMMARY OF THE INVENTION

This invention relates to an electrically-controlled mechanism usable in an automotive vehicle to prevent unauthorized persons from obtaining access to the vehicle fuel tank for theft of fuel or introducing contaminants into the fuel supply.

The mechanism preferably includes an electrical motor or solenoid located in a small compartment that contains the fuel tank filler tube. The motor or solenoid is associated with a locking means designed to retain a filler tube cap or access lid in a closed position under normal operating conditions, or when the vehicle is left unattended. A manual switch in the driver compartment is electrically connected between the vehicle battery and the above-mentioned electrical motor or solenoid. The switch can be actuated so that battery power is supplied to the electrical motor or solenoid for unlocking the filler tube cap or access lid.

The invention enables the driver of the vehicle to control access to the vehicle fuel tank.

THE DRAWINGS

FIG. 3 is a sectional view through a further structure embodying the invention.

FIG. 4 is a sectional view through an additional embodiment of the invention.

FIG. 5 is a sectional view taken through an additional embodiment of the invention.

FIG. 6 is a view taken on line 6—6 in FIG. 5.

DESCRIPTION OF A PREFERRED EMBODIMENT OF THE INVENTION

Figure 1:
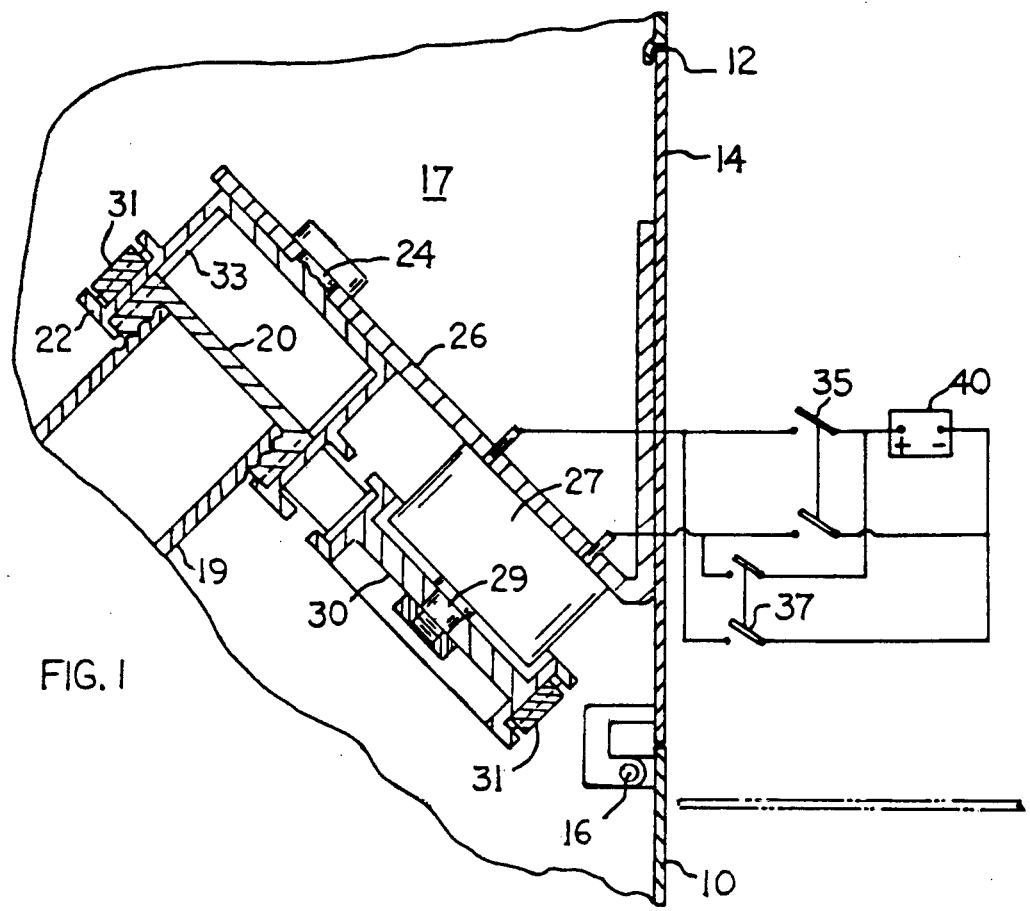
FIG. 1 is a fragmentary sectional view taken through a vehicle having one embodiment of the invention incorporated therein.

FIG. 1 fragmentarily shows a conventional automotive vehicle having an exterior side wall 10 formed with an access opening 12 therein. An upright lid 14 is hingedly mounted on the vehicle for swinging motion around a horizontal swing axis 16. The compartment 17 to the left of wall 10 contains a fuel tank filler tube 19. As shown in FIG. 1, the filler tube is closed by a cap 20 that has a screw thread connection with the tube.

Cap 20 is slidably keyed within (on) a hollow rotary gear 22 that has a stub shaft 24 rotatably extending through a circular opening in a mounting bracket 26 carried on lid 14. A rotary reversible electric motor 27 is mounted on bracket 26 with its drive shaft 29 affixed to a second rotary gear 30. A flexible endless toothed belt 31 extends around the two gears.

When motor 27 is energized in one direction the two gears 30 and 22 are rotated. Gear 22 exerts a rotary thrust on cap 20, via key means 33, such that the cap is screwed off of filler tube 19 to a detached condition. With cap 20 detached from tube 19, lid 14 can be opened to gain access to tube 19. As the lid is moved to its open position (shown in dashed lines) the cap 20 moves away from tube 19 to a non-obstruct position.

After fuel has been pumped into tube 19 lid 14 can be returned to its FIG. 1 closed condition. Motor 27 may then be operated in the reverse direction to screw cap 20 back onto the threaded portion of tube 19.

Motor 27 can be controlled remotely from the driver compartment, using on-off switches. FIG. 1 shows two manual switch mechanisms 35 and 37 located in the driver compartment for controlling the delivery of electrical power from vehicle battery 40 to the reversible motor 27. The switch mechanisms are considered conventional.

The two gears 22 and 30 may be in direct mesh with one another, in lieu of using the toothed belt 31. Also, motor 27 could be directly connected to stub shaft 24, thereby obviating the need for gear 30.

Figure 2:
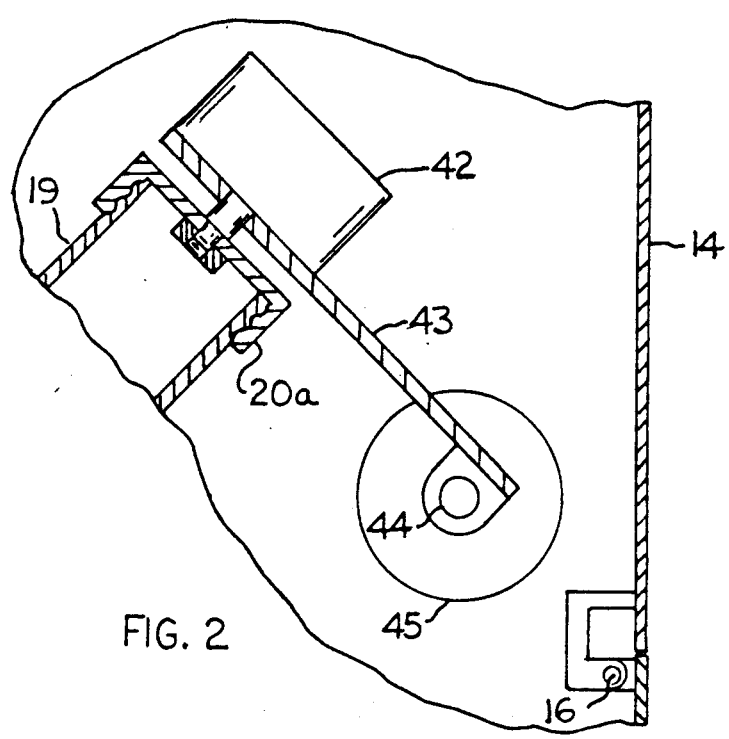
FIG. 2 is a fragmentary section view through another structure embodying the invention.

FIG. 2 shows a second form of the invention wherein cap 20a is directly affixed to the shaft of a reversible motor 42 carried on an arm structure 43. The right end of arm structure 43 is attached to the drive shaft 44 of a second reversible electric motor 45. When motor 42 is operated in one direction cap 20a is screwed off of the filler tube 19. The second motor 45 can then be operated to swing arm structure 43 clockwise to a non-obstruct position away from filler tube 19. When fuel has been pumped into tube 19 the motors may be operated in the reverse directions to return cap 20a to its closed condition. The motors can be controlled by manual switch means located in the driver compartment.

FIG. 3 shows another form of the invention wherein access to filler cap 20b is prevented by locking the access lid 14 in its closed condition. The locking means comprises a sector gear 50 extending from lid 14 and having its teeth centered on the lid hinge axis. A reversible electric motor 52 is fixedly mounted in compartment 17 with its drive shaft 53 extending across sector gear 50. Shaft 53 carries a pinion gear 55 that is in mesh with the sector gear.

Access to cap 20b is controlled (prevented) by lid 14. Brake means within motor 52 prevents shaft 53 from rotating except when the motor is energized. The teeth on gears 50 and 55 interengage to releasably retain lid 14 in its closed condition. Motor 52 may be controlled by switch mechanisms located within the driver compartment.

FIG. 4 shows an embodiment of the invention wherein a locking arm 60 is moveable between a locking position extending partially across the end face of filler cap 20c and an unlocking position out of axial registry with the cap. Arm 60 is shown in its locking position.

Arm 60 is pivotably mounted within a casing 62 for swinging motion around a pivot connection 63. Solenoid 64 has an armature 66 whose outer end portion includes a flat edge 67 engageable with arm 60 to prevent the arm from moving counterclockwise from its FIG. 4 position. However, when the solenoid is electrically energized the armature 66 is drawn to the left, such that arm 60 can be drawn upwardly (counterclockwise) by a tension spring 69. When the solenoid is de-energized a coil spring within the solenoid drives armature 66 back to its FIG. 4 position; end surface 70 of the armature acts as a cam to move arm 60 to the FIG. 4 position. A switch mechanism in the driver compartment can be used to control solenoid 64. Filler cap 20c can be screwed onto, or off of, filler tube 19 only when solenoid 64 is energized.

FIGS. 5 and 6 show a form of the invention that is similar in some respects to the FIG. 3 structure. Lid 14 has two arms 76 extending into compartment 17 so as to overlap fixed brackets 77; one of the arms is pivotably connected to the associated bracket. The other arm 76 is affixed to the drive shaft 79 of a reversible electric motor 80. When the motor is energized in one direction lid 14 is swung around the axis of shaft 79, from the closed condition (full lines) to an open condition (dashed lines). Reverse energization of the motor returns the lid to its closed condition. Brake action within motor 80 normally keeps the lid closed.

Motor 80 can be remotely controlled by electric switch mechanisms located within the driver compartment. Electric power is supplied by the vehicle battery.

Figure 7:
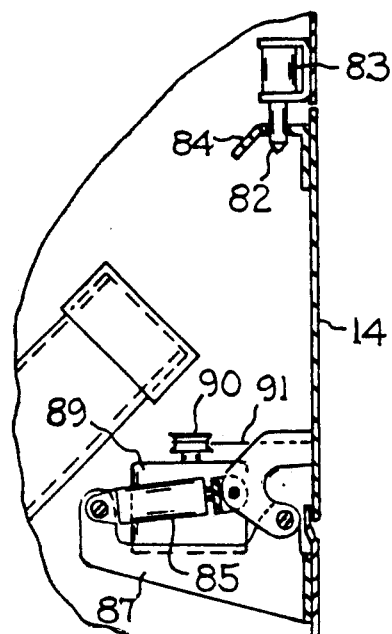
FIG. 7 is a view taken in the same direction as FIG. 3, but illustrating another embodiment of the invention.

FIG. 7 illustrates an arrangement wherein lid 14 is normally held in a closed position by a latch bolt 82 that extends downwardly from the armature of a solenoid 83 through an opening in a keeper element 84 mounted on the rear face of lid 14; when the solenoid is de-energized a coil spring within the solenoid urges bolt 82 downwardly to the lid-locking condition. A manual switch in the driver compartment is used to energize solenoid 83 and thereby unlock lid 14. A resilient action cylinder 85 is trained between a fixed bracket 87 and lid 14, such that when solenoid 83 is energized to unlock the lid a coil spring or trapped mass of pressurized liquid in cylinder 85 urges the lid to an open condition; this action enables the person filling the fuel tank to immediately gain access to cap 20b without having to open lid 14. Lid 14 can be returned to the closed position manually or remotely by means of a rotary electric motor 89 suitably mounted on bracket 87. The motor drive shaft carries a small pulley (grooved disk) 90 that has a flexible cord or wire 91 wrapped therearound. The free end of wire 91 is attached to lid 14. When motor 89 is energized by a switch at the driver compartment pulley 90 is rotated to draw wire 91 onto the pulley, thereby pulling lid 14 to the closed position. Closing motion of the lid resets cylinder 85.

Figure 8:
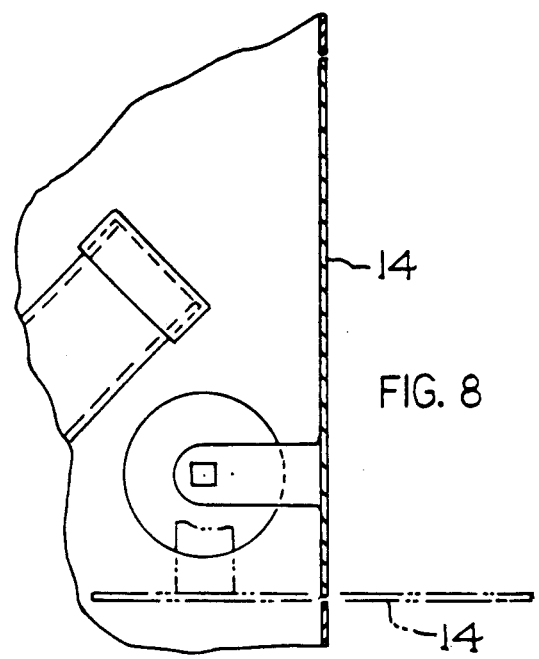
FIG. 8 is a view taken in the same direction as FIG. 5, but illustrating a variant of the FIG. 5 structure.

FIG. 8 illustrates a variant of the structural arrangement depicted in FIG. 5. In the case of the FIG. 8 construction lid 14 swings in a downward arc around the axis of motor 80 when the lid is going from the closed position (full lines) to the open position (dashed lines). Motor 80 is a reversible motor having an internal brake means that is effective to keep lid 14 in the closed position when the motor is de-energized.

Figure 9:
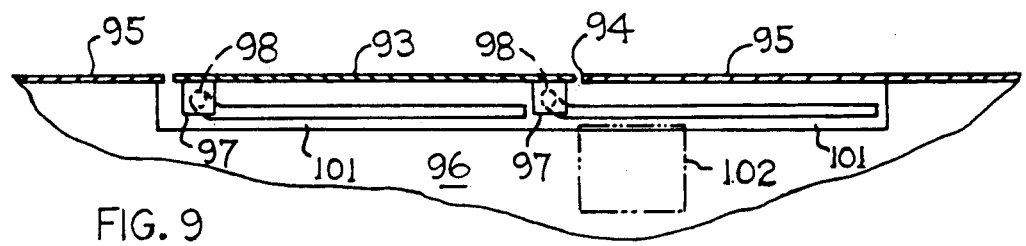
FIG. 9 is a sectional view taken on line 9—9 in FIG. 10, and illustrating another form that the invention can take.
Figure 10:
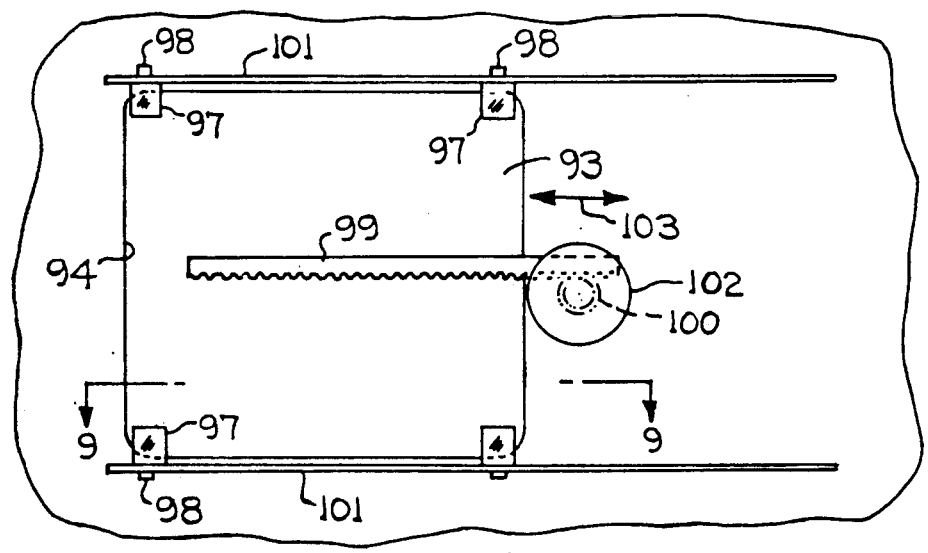
FIG. 10 is an elevational view of the FIG. 9 construction.

FIGS. 9 and 10 show an arrangement that includes a vertically oriented lid 93 that is normally flush with body panel 95 within an access opening 94 in the vehicle body panel. The fuel tank filler tube is not shown in FIG. 9 and 10, but the filler tube would be located within space 96 behind lid 93 (i.e., below lid 93 in FIG. 9). Lid 93 is adapted for lateral slidable movement along the inner (rear) face of panel 95 to enable the gasoline station attendant to gain access to the fuel tank filler tube. Slotted guide plates 101 are mounted on the rear face of panel 95 above and below access opening 94. Lid 93 carries rectangular blocks 97 that ride along the faces of fixed plates 101; circular guide pins 98 extend from the blocks through the slots in plates 101, thereby guiding lid 93 as it moves laterally toward or away from access opening 94.

Lid 93 carries a toothed rack 99 that is in mesh with a pinion gear 100 that is axially slidably keyed to the shaft of a reversible electric motor 102. A bracket structure (not shown) is used to support motor 102 in a fixed location to one side of access opening. Motor operation is effective to move lid 92 toward or away from opening 94, as indicated by arrow 103 in FIG. 10. Motor 102 will be controlled by manual switch means on the vehicle dashboard.

It can be seen from the range of illustrations that the invention can be practiced in various different ways.

I claim:

1. In an automotive vehicle having an exterior wall, an opening in said wall, a lid movably mounted on the vehicle to close said opening, a fuel tank filler tube having an open end registering with said wall opening whereby fuel may be pumped into said filler tube when the lid is moved to an open condition, and a cap having a screw thread connection with the filler tube for normally closing its open end, the improvement comprising: a rotary reversible electrical motor having a drive connection with said cap for normally holding the cap in a closed position on the filler tube; means for supplying electrical power to said motor; and a switch means located in the driver compartment of the vehicle for controlling the delivery of electrical power to said motor; said drive connection being effective so that rotation of the motor in one direction screws the cap onto the filler tube, and rotation of the motor in the other direction unscrews the cap from the filler tube.

2. The improvement of claim 1 wherein said drive connection comprises a first driven gear connected to said cap, and a second drive gear operatively connected to the motor, whereby electrical energization of the motor enables the second gear to transmit a drive force to said first gear and thence to said cap.

3. The improvement of claim 2, wherein said drive connection further comprises an endless toothed belt trained around said first and second gears.

4. The improvement of claim 2, wherein said cap is slidably keyed on said first gear for axial motion while the cap is turning on the filler tube.

5. The improvement of claim 1, wherein said electrical motor is mounted on said lid.

6. The improvement of claim 1, and further comprising an arm structure swingably mounted in the vehicle between the lid and the filler tube; said motor being carried on said arm structure, whereby the arm structure can be manipulated to draw the cap away from the filler tube.

7. The improvement of claim 6, and further comprising a second electrical motor (45) connected to said arm structure for swinging said arm structure toward or away from the filler tube.

* * * * *